United States Patent [19]
Morley

[11] Patent Number: 5,805,116
[45] Date of Patent: Sep. 8, 1998

[54] TWO-FEED FULL DUPLEX TRANSMITTER/ RECEIVER FOR ULTRA SMALL-APERTURE SATELLITE COMMUNICATIONS TERMINAL

[75] Inventor: Steven A. Morley, Escondido, Calif.

[73] Assignee: Qualcomm Incorporated, San Diego, Calif.

[21] Appl. No.: 880,000

[22] Filed: Jun. 20, 1997

Related U.S. Application Data

[63] Continuation of Ser. No. 640,299, Apr. 30, 1996, abandoned.
[51] Int. Cl.⁶ ............................ H01Q 19/14; H01Q 19/12
[52] U.S. Cl. ...................... 343/779; 343/840; 343/781 R
[58] Field of Search ................................ 343/840, 781 P, 343/781 R, 781 GA, 779; H01Q 19/14, 19/12

[56] References Cited

U.S. PATENT DOCUMENTS

| | | | |
|---|---|---|---|
| 4,638,322 | 1/1987 | Lamberty | 343/840 |
| 4,712,111 | 12/1987 | Ohta et al. | 343/840 |
| 5,434,586 | 7/1995 | Kinoshita et al. | 343/840 |

*Primary Examiner*—Hoanganh T. Le
*Attorney, Agent, or Firm*—Russell B. Miller; Brian S. Edmonston

[57] ABSTRACT

The satellite communications terminal employs separate transmit and receive feedhorns, offset from one another, to achieve adequate isolation of received and transmitted signals during full duplex operation. In one implementation, described herein, the satellite communications terminal employs an ultra-small-aperture dish antenna having an aperture of about one meter. Signals are received and transmitted at Ku band wavelengths of about 12 gigahertz and 14 gigahertz respectively. For this implementation, an extended focal point zone occurs, rather than a discrete focal point. Both the receive and transmit feedhorns are positioned within the focal point zone thereby achieving adequate gain to both reception and transmission. However, the receive and transmit feedhorns are offset from one another to minimize the coupling of feedback transmission signals into the receive feedhorn. In one specific implementation, for use in transmitting signals to and receiving signals from a geosynchronous satellite, the receive feedhorn is positioned at an ideal focal point for reception to maximize the receive gain. The transmit feedhorn is offset within the focal point zone by an amount sufficient to achieve adequate isolation while also minimizing off-axis signal transmissions, which might interfere with the reception of signals by other adjacent geosynchronous satellites. For other implementations, wherein the frequencies of reception and transmission and the characteristics of the antenna dish yield significant Fresnel diffraction effects, the ideal focal points for reception and transmission may be offset from one another. In such implementations, the receive and transmit feedhorns are both positioned at their respective ideal focal points. Method and apparatus implementations of the invention are disclosed.

40 Claims, 3 Drawing Sheets

TWO-FEED FULL DUPLEX TRANSMITTER/RECEIVER FOR ULTRA SMALL-APERTURE SATELLITE COMMUNICATIONS TERMINAL

This is a continuation of application Ser. No. 08/640,299, filed Apr. 30, 1996, now abandoned.

BACKGROUND OF THE INVENTION

I. Field of the Invention

The invention generally relates to satellite communication terminals and in particular to satellite communication terminals employing ultra-small-aperture dish antennas.

II. Description of Related Art

Satellite communication terminals are being increasingly targeted for use by private individuals and small businesses. Examples include credit card verification systems for use by service stations, and the like, for transmitting credit card information from a customer to a central credit card verification bureau via a geosynchronous satellite and for receiving responsive credit card authorization signals from the verification bureau, also via the satellite. Such communication terminals have become increasingly popular, in part, because the terminal eliminates the need to place a telephone call to the verification bureau which may be fairly time consuming. Other examples of satellite communication terminals include terminals configured for receiving television signals directly from geosynchronous satellites for display on television sets of individuals or small businesses. A wide range of other applications have already been developed and additional applications are being developed rapidly.

For most applications directed to individuals or small businesses, it is particularly important to provide satellite communication terminal equipment which is reasonably inexpensive. Recently, satellite communication technology has advanced to the point that ultra-small-aperture dish antennas (i.e., antennas having a diameter of about one meter or less) are feasible for many such applications. Ultra-small-aperture dish antennas are particularly desirable for such applications because the cost of the antenna itself may be reduced over that of larger systems and the convenience to the individual or small business is greatly enhanced. The ultra-small-aperture dish antennas consume little space, can be mounted relatively easily, and can be placed substantially out of view from customers, neighbors or the like.

An example of an ultra-small-aperture dish satellite communications terminal is illustrated in FIG. 1. In particular, FIG. 1 illustrates a satellite communications terminal 10 having a parabolic dish antenna 12 and a transmitter/receiver device 14 having a single feedhorn 16. Mounting apparatus for mounting the transmitter/receiver to the antenna dish and the antenna dish to a suitable support are not shown.

An aperture of feedhorn 16 is placed as close as possible to an ideal focal point 17 for the antenna dish to thereby achieve maximum gain. For ultra-small-aperture dish antennas, the aperture of the antenna dish is fairly small relative to the wavelength of the receive and transmit signals. Hence, the focal "point" often comprises a relatively large zone or volume of space 18 rather than a discrete point. The aperture of the feedhorn is positioned somewhere within the focal point zone. Typically, signals received and transmitted by the transmitter/receiver through the feedhorn are polarized. The transmitter/receiver and the feedhorn are pivotably mounted to allow rotation thereof for proper alignment of the polarized signals based upon the polarization angle and the relative location of a geosynchronous satellite 20.

In use, the transmitter/receiver generates radio frequency (RF) signals for transmission through feedhorn 16 onto antenna dish 12. The transmitted signal is reflected from the dish toward geosynchronous satellite 20 for detection thereby. The satellite processes the signals and, depending upon the application, either directly generates responsive signals for transmission to the communications terminal or forwards the transmitted signals to a ground based station for further processing. In either case, responsive signals are ultimately received by the antenna dish and are reflected into the transmitter/receiver through the feedhorn for detection and subsequent processing. Although not separately shown, suitable data processing equipment may be interconnected to transmitter/receiver 14 for use in generating signals to be transmitted and for processing received signals. The data processing unit may be connected to a television set, computer system, service station gasoline pump, voice interface equipment or any of a variety of other devices.

For many practical applications, full duplex operation is required. That is, the terminal transmits one signal while simultaneously receiving a second signal. Receive and transmit signals are typically frequency offset from one another. For example, for standard Ku-band satellite communication terminal devices, the frequency of signals received by the terminal is in a 12 gigahertz band. However the terminal transmit frequency is in a 14 gigahertz band. Despite the frequency offset, some transmitted energy in the 14 gigahertz band is typically radiated back into circuitry of a receive portion of the transmitter/receiver and can degrade the performance of the receiver during times of transmission. Transmitted signals are typically transmitted at fairly high power levels. Received signals, however, are typically received at very low power levels. The fed-back signal energy can be greater than that of the desired signal received from the satellite, thereby preventing the desired signal from being reliably received.

Various means of isolation have been previously implemented in an attempt to reduce the amount of fed-back transmission energy. Exemplary means include various types of frequency-specific filters, frequency-tuned splitter feedhorns, and orthogonal mode transducers, the latter of which are useful when the receive and transmit signal are of orthogonal polarities. Within FIG. 1, an exemplary isolation circuit 22 is shown as a portion of the receive/transmit unit. However, each of these means for achieving isolation can add significant costs to the terminal hardware. The additional costs, particularly within systems intended for individuals or small businesses, may render the terminal hardware equipment too expensive. Accordingly, it would be desirable to provide an improved technique for achieving isolation between receive and transmit signals within satellite communication terminals, particularly those employing ultra-small-aperture dish antennas, and it is to that end that the invention is principally drawn.

SUMMARY OF THE INVENTION

In accordance with the invention, a satellite communications terminal is provided with an antenna dish and transmit/receive apparatus having separate receive and transmit feedhorns. The receive and transmit feedhorns are mounted in relation to the antenna dish near an ideal focal point of the dish but spatially offset from one another. By providing separate receive and transmit feedhorns, spatially offset from one another, the amount of feedback energy coupled from the transmit feedhorn into the receive feedhorn is reduced over that of systems employing a common feedhorn. Accordingly, adequate isolation is achievable without requiring frequency-specific filters, frequency-tuned splitter feedhorns, orthogonal mode transducers or other conventional means for achieving isolation. As such, the overall cost for the satellite communications terminal may be significantly reduced over that of terminals requiring such isolation devices.

The invention is particularly well-suited for use with ultra-small-aperture dish antennas operated at frequencies yielding larger extended focal point zones as compared to aperture sizes for the receive and transmit feedhorns. As such, both the receive and transmit feedhorns can be placed within the same focal point zone without significant reduction in receive or transmit gain, while nevertheless achieving a significant increase in isolation.

In one specific implementation, the receive feedhorn is mounted at an ideal focal point for maximum gain of received signals. The transmit feedhorn is offset slightly from the receive feedhorn but remains within the extended focal point zone. The transmit feedhorn may, for example, be offset from the receive feedhorn radially and/or azimuthally with respect to the antenna dish. For certain antenna dish designs and for certain frequencies an ideal transmit focal point is offset significantly from an ideal receive focal point. For such implementations, the transmit feedhorn is preferably positioned at the ideal transmit focal point while the receive feedhorn is positioned at the ideal receive focal point. A wide range of relative mounting positions and arrangements may be provided in accordance with the general principles of the invention.

DETAILED DESCRIPTION OF EXEMPLARY EMBODIMENTS OF THE INVENTION

With reference to the remaining figures, exemplary embodiments of the invention will now be described. It should be appreciated that not all components necessary for a complete implementation of a practical system are illustrated or described in detail. Rather, only those components necessary for a thorough understanding of the invention are illustrated. Components which are either conventional or may be readily designed and fabricated in accordance with the teachings provided herein are not described in detail.

Figure 1:
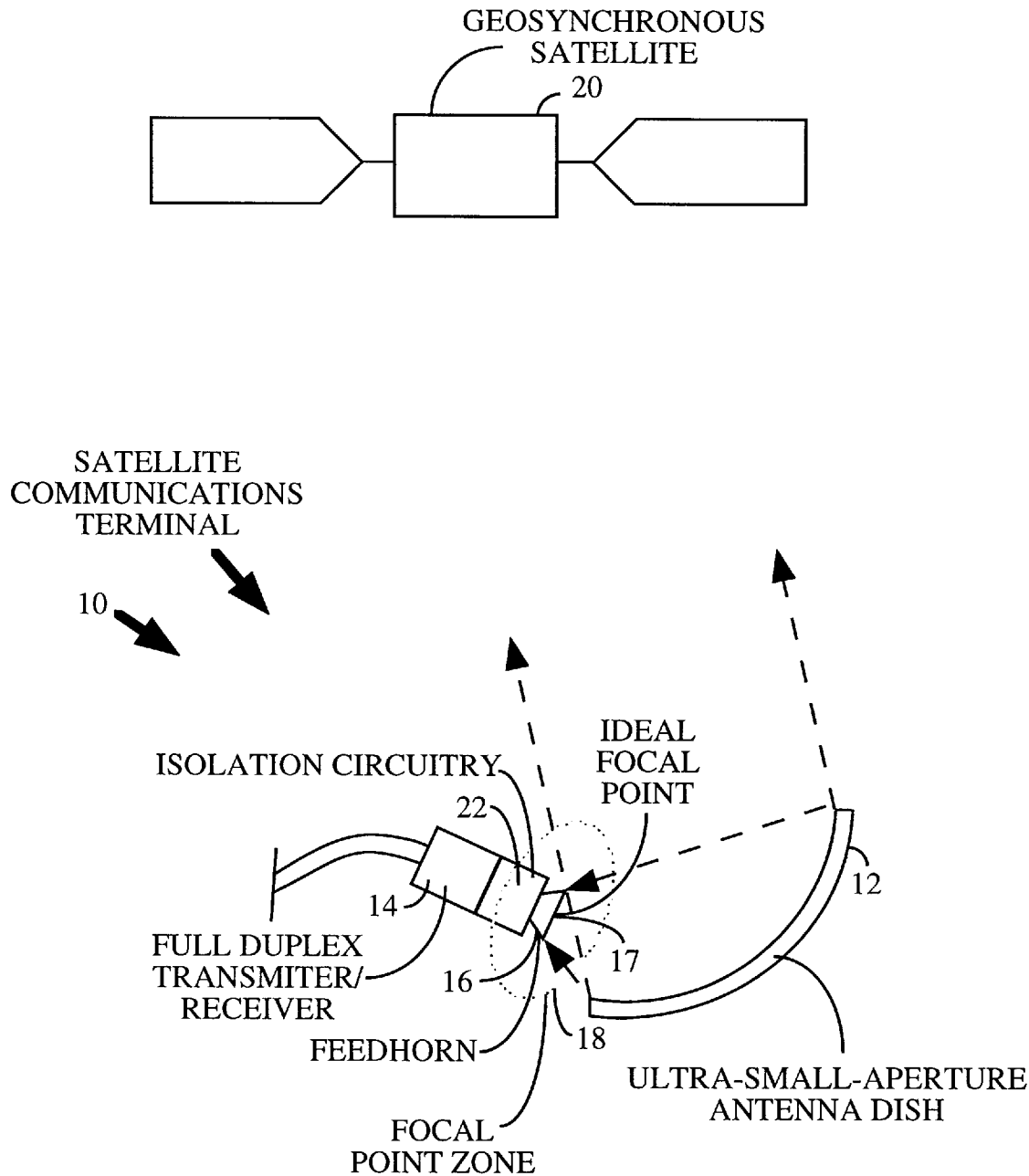
FIG. 1 is a diagram illustrating an ultra-small-aperture dish satellite communications terminal, configured in accordance with the prior art, and having an isolation circuit for isolating fed-back transmit signals from received signals during full duplex operation.
Figure 2:
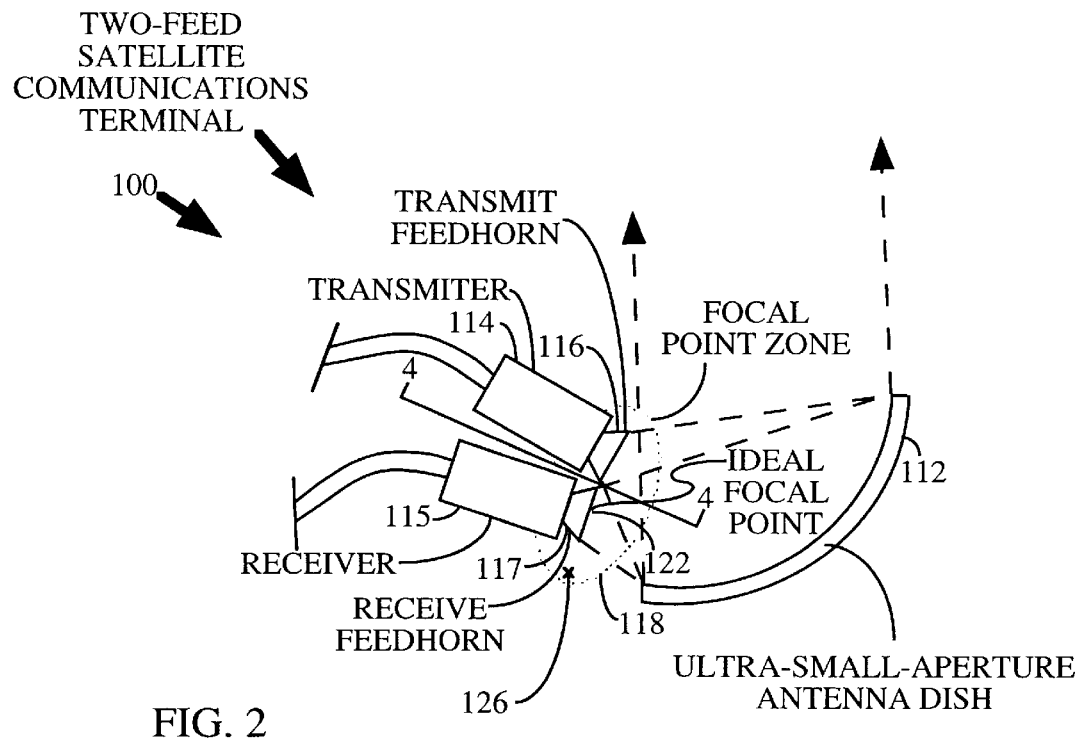
FIG. 2 is a diagram illustrating an ultra-small-aperture dish satellite communications terminal, configured in accordance with the invention, having separate transmit and receive feedhorns.

FIG. 2 illustrates a ultra-small-aperture satellite communications terminal 100 having a dish antenna reflector 112, a transmitter 114 and a receiver 115 which have separate transmit and receive feedhorns 116 and 117, respectively. Collectively, the receive and transmit devices are herein referred to as a full-duplex transmitter/receiver device.

Transmit feedhorn 116 is spatially offset from receive feedhorn 117. Both, however, are disposed within a focal point zone 118. More specifically, receive feedhorn 117 has an aperture positioned at an ideal focal point 122 of the dish antenna reflector. Transmit feedhorn 116 has an aperture offset from the ideal focal point but still within the focal point zone 118. For the exemplary implementation 102, the characteristics of the dish antenna reflector and the selected frequencies for reception and transmission are such that the ideal receive and transmit focal points are co-located. Accordingly, the ideal focal point 122 represents an ideal focal point both for reception and transmission. The receive feedhorn aperture is disposed at the ideal focal point to maximize the gain of received signals. The transmit feedhorn aperture is offset from the ideal focal point to reduce an amount of feedback energy coupled into the receive feedhorn during transmission while still ensuring a sufficient amount of power to reliably transmit the signal to a remote geosynchronous satellite (not shown). Within FIG. 2, the transmit feedhorn is shown to be both radially and azimuthally offset from the ideal focal point position. In other implementations, the transmit feedhorn aperture may be offset only radially or only azimuthally. In still other implementations, both the receive feedhorn aperture and the transmit feedhorn aperture may be offset from the ideal focal point. Such is advantageous within systems wherein the strength of a received signal is sufficient such that it can be reliably received without the receive feedhorn being positioned at the ideal focal point.

In use, transmitter 114 and receiver 115 operate in full-duplex mode wherein signals are transmitted and received simultaneously. For an exemplary Ku band, signals are transmitted within a bandwidth centered at about 14 gigahertz and signals are received at a bandwidth centered at about 12 gigahertz. Transmitted signals emanate from the aperture of transmit feedhorn 116 and are directed onto antenna reflector 112 for reflection therefrom to the remote geosynchronous satellite. Preferably, the transmit feedhorn is oriented and located at a position sufficient to ensure that the antenna dish is substantially equally illuminated by transmitted signals to ensure maximum gain while also ensuring that no significant portion of the transmitted signals miss the antenna dish. Any such signals would represent a loss of transmit energy and might also interfere with other electromagnetic reception devices in the vicinity. By offsetting the transmit feedhorn somewhat from the ideal focal point, uniform illumination of the antenna reflector dish may not be perfect. Accordingly, some loss and transmit gain over a system having a transmit feedhorn positioned at an ideal focal point occurs. Depending upon the application, it may be desirable to configure the shape of the dish antenna reflector and position the transmit feedhorn to achieve fairly uniform illumination in accordance with conventional off-axis antenna techniques.

In any case, signals transmitted by transmitter 114 are reflected by the antenna dish in the direction of a geosynchronous satellite which receives and processes the signals. Depending upon the application, the transmit signals may provide a variety of the information. For credit card verification systems, particularly for use with service stations, the transmit signals may include credit card information for which verification is required. For television systems, the transmitted signals may identify, for example, pay-per-view movies selected by a user. Also, depending upon the application, the geosynchronous satellite may process the signals directly or may retransmit the signals to an earth-based station for further processing. Ultimately, responsive signals are transmitted from the geosynchronous satellite to the terminal 100. A portion of the signals are reflected by the antenna dish into the receive feedhorn for propagation into detection components (not separately shown) of receiver 115. Again, depending upon the application, the received signals may contain a wide variety of information. The received signals may be routed to external processing equipment, such as a computer, a television set, or the like. The content of the signals, and their manner of transmission and reception, may be entirely conventional and will not be further described.

By offsetting the transmit feedhorn from the receive feedhorn, feedback of transmitted signals into the receive feedhorn is significantly reduced over conventional systems having only a single feedhorn. For example, depending upon the shape of the antenna dish reflector, feedback signals may be directed primarily to a point of maximum feedback energy 126 diametrically offset from the transmit feedhorn location within the focal point zone. Hence, the location of maximum feedback energy is also offset from the receive feedhorn and little, if any, feedback energy is coupled into the receive feedhorn. For the arrangement of FIG. 2 wherein the transmit feedhorn is offset both azimuthally and radially from the receive feedhorn, the point of maximum feedback energy is likewise offset both radially and azimuthally from the receive feedhorn. In other implementations, the point of maximum transmit feedback energy may be offset only radially or only azimuthally. In any case, so long as the point of maximum feedback energy is offset somewhat from the aperture of the receive feedhorn, significant isolation between transmit and receive signals is thereby achieved. This isolation is achieved without requiring any specific isolation circuitry such as frequency-specific filters, frequency-tuned splitter feedhorns or orthogonal mode transducers. The amount of isolation achieved depends, of course, upon the relative locations of the receive and transmit feedhorns, the shape and electromagnetic characteristics of the dish antenna reflector, and the frequency and other characteristics of the signals being received and transmitted.

Figure 3:
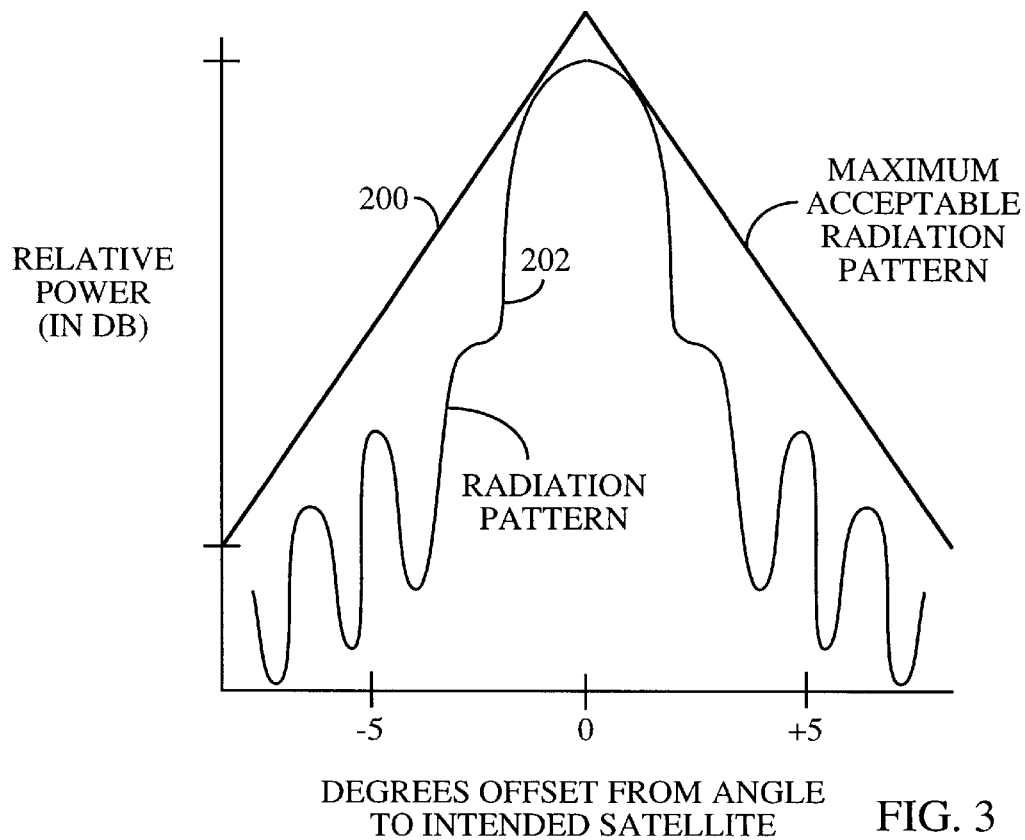
FIG. 3 is a graph illustrating a radiation pattern for an exemplary implementation of the satellite communications terminal of FIG. 2.

For applications wherein signals are transmitted from a location within the United States to a geosynchronous satellite, it is necessary to ensure that the characteristics of the transmitted signal radiation pattern conform to Federal Communications Commission (FCC) requirements. Briefly, these requirements specify the acceptable frequencies of transmission and reception as well as acceptable amounts of off-axis transmit signal energy. In other words, if signals are transmitted to a geosynchronous satellite along an axis extending from the antenna dish reflector to the satellite, FCC requirements specify how much signal strength can be transmitted off-axis for a range of azimuthal angles. FIG. 3 illustrates a graph showing exemplary maximum permissible signal strengths for Ku band transmissions as a function of azimuthal angle about an axis extending from the satellite transmission terminal. More specifically, FIG. 3 illustrates a simplified exemplary acceptable maximum permissible radiation pattern or mask 200 and an exemplary radiation pattern 202 generated by the satellite communications terminal FIG. 2. In practice, actual radiation masks may be more complicated in shape than that of FIG. 3. The simple exemplary mask of FIG. 3 is provided mainly to illustrate the concept of the radiation mask. As can be seen, the radiation pattern 202 is, at all illustrated azimuthal angles, below the maximum permissible radiation pattern.

Also, because the transmit feedhorn is offset from the ideal focal point position, the transmit radiation pattern is not symmetric. The aforementioned FCC requirements are provided primarily to ensure that transmitted signals are not also directed to other geosynchronous satellites which could result in interference with the operation of such adjacent satellites.

Thus, although in principle, the transmit feedhorn may be positioned anywhere within the focal point zone, some constraints on the location may be imposed by the need to achieve an adequate signal strength for allowing the geosynchronous satellite to reliably receive the signals while also ensuring that the FCC off-axis radiation strength limitations are met and for ensuring that an adequately small amount of feedback energy is coupled into the receive feedhorn.

Figure 4:
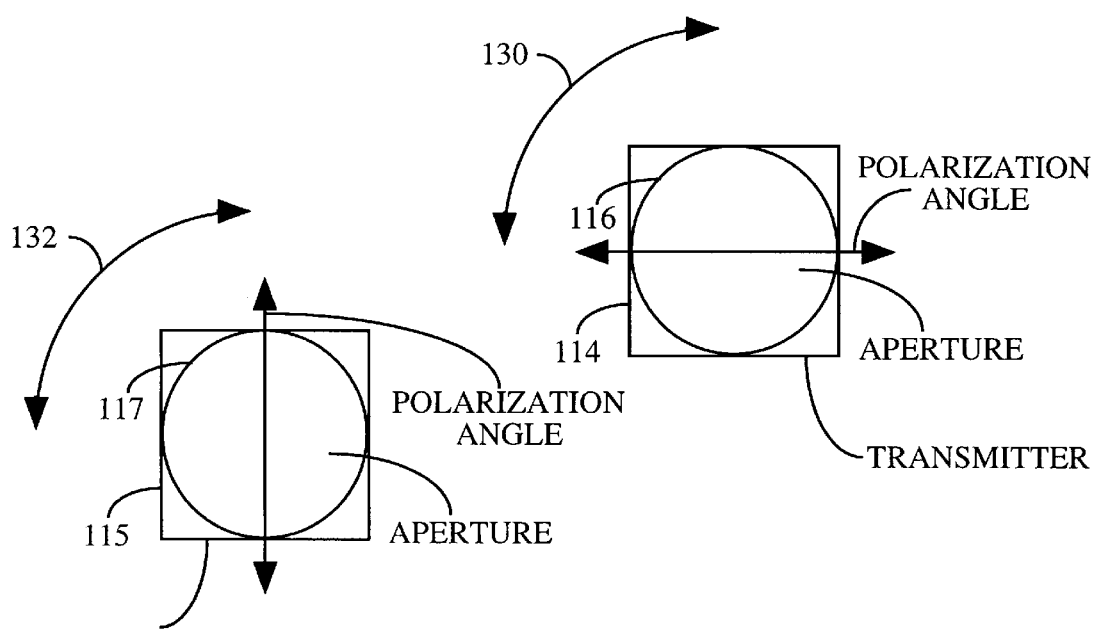
FIG. 4 is a partial view, taken along line 4—4 of FIG. 2, showing a pair of pivotable receive and transmit feedhorns.

For many applications, the receive and transmit signals need to be polarized. The polarization angle, depends, in part, on the relative location of the satellite communications terminal and the geosynchronous satellite. To allow the polarization angle to be set properly, both the receiver and the transmitter are preferably pivotably mounted for independent rotation about a longitudinal axis of the receiver or transmitter. This is shown in FIG. 4. More specifically, FIG. 4 provides front views of both transmitter 114 and receiver 115 including the respective receive and transmit feedhorns 116 and 117. Both devices are independently pivotably mounted for axial rotation. Within FIG. 4, the independent pivotability of the separate feedhorns is identified by rotation arrows 130 and 132.

Figure 5:
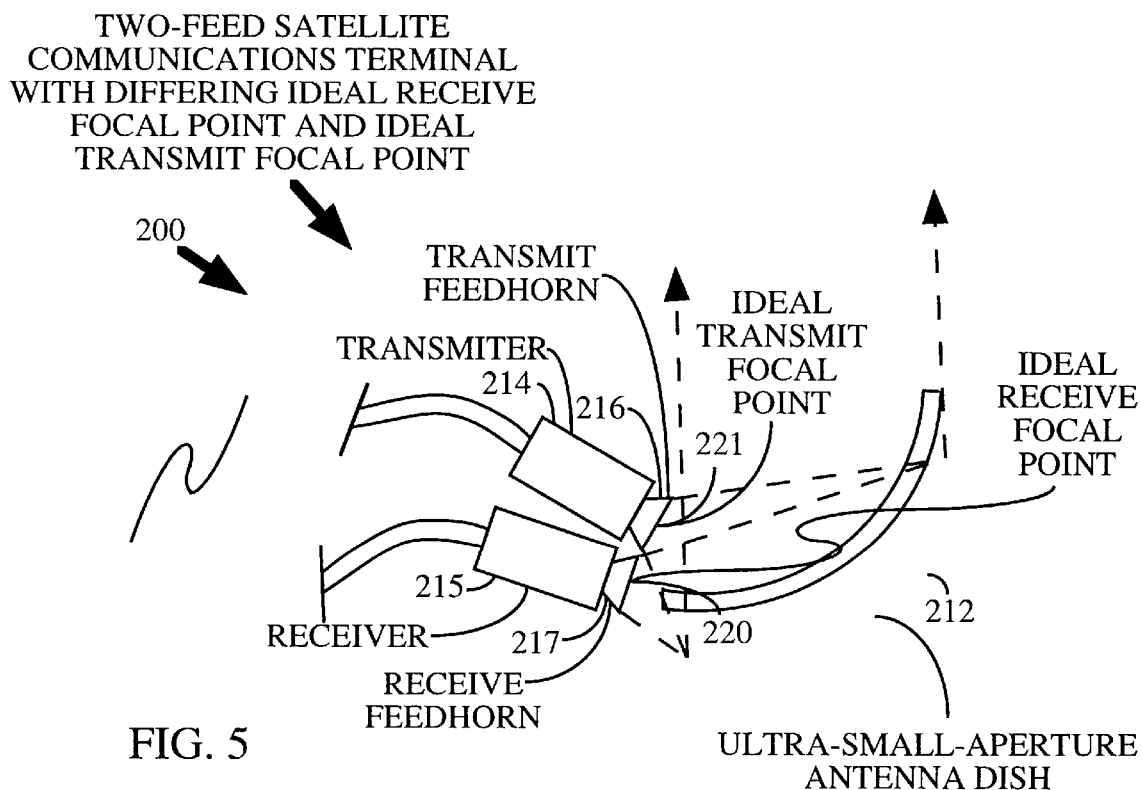
FIG. 5 is a diagram of an alternative implementation of the satellite communications terminal of FIG. 2 wherein reflection/refraction characteristics of the antenna dish provide separate focal point zones for receive and transmit frequencies.

For certain antenna shapes and technologies and certain frequencies of reception and transmission the ideal focal point for reception will differ somewhat from that of transmission. This is illustrated in FIG. 5 with reference to a satellite communications terminal 200. Satellite communications terminal 200 is similar to the communications terminal of FIG. 2 and like components are identified by like reference numeral incremented by 100. Only pertinent differences will be described.

Unlike the arrangement of FIG. 2 wherein a single focal point zone surrounding a single ideal focal point occurs, the arrangement of FIG. 5 provides for separate receive and transmit focal points 220 and 221 respectively and separate surrounding focal point zones 221 and 223 respectively. An aperture of a receive feedhorn 217 is positioned at the ideal receive frequency focal point. An aperture of a transmit feedhorn 216 is positioned at the ideal transmit frequency focal point. Hence, there is little or no loss in the gain over conventional systems having a single feedhorn at a single ideal focal point location. Yet, because the receive and transmit feedhorns are offset from one another significant isolation is achieved. For practical systems, the desirability of employing the arrangement of FIG. 5 depends, of course, upon the amount of offset between the ideal receive and transmit focal points and any physical constraints imposed upon the system. For some applications, if the receive and transmit feedhorns are fairly large and the offset between the respective ideal focal points is small, it may not be possible to position both feedhorns at their respective ideal focal point positions without physical interference of the feedhorns or associated receive and transmit devices. For such implementations, it is desirable simply to employ the teachings described above with reference to FIG. 2 wherein the receive feedhorn is positioned at the ideal focal point for reception and the transmit feedhorn is offset slightly therefrom while remaining within an overall focal point zone.

What has been described are techniques for achieving isolation between receive and transmit frequencies. Principles of the invention are especially well-suited for use with ultra-small-aperture dish antennas having an aperture of four meters or less and in particular to dishes having apertures of only about one meter or less. Also, the invention is particularly well-suited for Ku band transmissions but is also applicable to other transmission bandwidths as well. Indeed, principles of the invention may be applied in any antenna dish wherein the transmit and receive frequencies and the characteristics of the dish itself allow the receive and transmit feedhorns to be offset from one another by an amount sufficient to achieve adequate isolation while still allowing sufficient gain. For implementations wherein the receive signal strength is much less than that of the transmit signal strength, it is desirable to place the receive feedhorn at the ideal focal point for reception and to offset the transmit feedhorn. In other applications, the receive signal may be greater than that of the transmit signal. Hence, it may be desirable to position the transmit feedhorn at the ideal focal point and offset the receive feedhorn. In still other implementations, it may be desirable to provide two or more transmit feedhorns or two or more receive feedhorns, perhaps in a phased array.

In general a wide range of implementations are consistent with the principles of the invention. The specific exemplary embodiments described herein are provided merely to illustrate the invention and should not be construed as limiting the scope of the invention.

I claim:

1. In a satellite communications terminal having an antenna dish and at least one full-duplex transmitter/receiver device, an improvement comprising:

providing the at least one of the full-duplex transmitter/receiver device with a means for receiving signals and a separate means for transmitting signals, with said means for receiving signals including a receive feedhorn for receiving signals only and with said means for transmitting including a transmit feedhorn for transmitting signals only, with the receive and transmit feedhorns mounted in relation to the antenna dish with the receive and transmit feedhorns being spatially offset from one another.

2. The improvement of claim 1 wherein the receive feedhorn is located near a predetermined ideal focal point position based upon a preselected frequency of reception.

3. The improvement of claim 2 wherein the receive feedhorn is located near a predetermined ideal focal point position based upon a preselected frequency of reception of about 12 gigahertz.

4. The improvement of claim 1 wherein the transmit feedhorn is positioned at or near a predetermined ideal focal point position for transmission based upon a pre-selected frequency of transmission.

5. The improvement of claim 4 wherein the transmit feedhorn is located at or near a predetermined ideal focal point position for transmission based upon a preselected frequency of transmission of about 14 gigahertz.

6. The improvement of claim 4 wherein the transmit feedhorn is offset from the predetermined ideal focal point position for transmission by a minimum distance necessary to avoid physical obstruction with the receive feedhorn.

7. The improvement of claim 4 wherein a predetermined ideal focal point position for reception is offset from the predetermined ideal focal point for transmission.

8. The improvement of claim 4 wherein the transmit feedhorn is offset perpendicular to a plane defined by a line extending through the ideal focal point of transmission and a center of the antenna dish and a line extending along a direction of reflection of signals transmitted from the ideal focal position toward the center of the antenna dish.

9. The improvement of claim 4 wherein the transmit feedhorn is offset from the ideal focal point position for transmission by an amount, and in a direction, selected to achieve a desired pre-selected attenuation of transmitter-to-receiver feedback energy while minimizing loss in antenna gain for signals received from a predetermined target location.

10. The improvement of claim 4 wherein the ideal focal point for transmission and an ideal focal point for reception are both located within a common focal point zone.

11. The improvement of claim 1 wherein the receive and transmit feedhorns respectively receive and transmit linearly polarized signals and wherein the receive and transmit feedhorns are separately, pivotably mounted in relation to said antenna dish to allow linear polarization alignment with a predetermined target location.

12. The improvement of claim 11 wherein the predetermined target location is the location of a preselected geosynchronous satellite.

13. The improvement of claim 1 wherein the dish antenna and the receive and transmit feedhorns provide substantially equal illumination of the antenna dish and only the antenna dish.

14. The improvement of claim 1 wherein the transmit feedhorn provides a transmission radiation pattern having a magnitude, as a function of azimuthal angle, that is less than a predetermined maximum acceptable radiation pattern magnitude for a predetermined selected range of azimuthal angles.

15. The improvement of claim 1 wherein the antenna dish is 4 meters or less in diameter.

16. A satellite communications terminal comprising:

an antenna dish; and at least one full-duplex transmitter/receiver device having a means for receiving signals and a separate means for transmitting signals, with said means for receiving signals including a receive feedhorn for receiving signals only and with said means for transmitting signals including a transmit feedhorn for transmitting signals only, with the receive and transmit feedhorns mounted in relation to the antenna dish with the receive and transmit feedhorns being spatially offset from one another.

17. The terminal of claim 16 wherein the receive feedhorn is located near a predetermined ideal focal point position based upon a preselected frequency of reception.

18. The terminal of claim 17 wherein the receive feedhorn is located near a predetermined ideal focal point position based upon a preselected frequency of reception of about 12 gigahertz.

19. The terminal of claim 17 wherein the transmit feedhorn is positioned at or near a predetermined ideal focal point position for transmission based upon a pre-selected frequency of transmission.

20. The terminal of claim 19 wherein the transmit feedhorn is located at or near a predetermined ideal focal point position for transmission based upon a preselected frequency of transmission of about 14 gigahertz.

21. The terminal of claim 19 wherein the transmit feedhorn is offset from the predetermined ideal focal point position for transmission by a minimum distance necessary to avoid physical obstruction with the receive feedhorn.

22. The terminal of claim 19 wherein a predetermined ideal focal point position for reception is offset from the predetermined ideal focal point for transmission.

23. The terminal of claim 19 wherein the transmit feedhorn is offset perpendicular to a plane defined by a line extending through the ideal focal point of transmission and a center of the antenna dish and a line extending along a direction of reflection of signals transmitted from the ideal focal position toward the center of the antenna dish.

24. The terminal of claim 19 wherein the transmit feedhorn is offset from the ideal focal point position for transmission by an amount, and in a direction, selected to achieve a desired pre-selected attenuation of transmitter-to-receiver feedback energy while minimizing loss in antenna gain for signals received from a predetermined target location.

25. The terminal of claim 19 wherein the ideal focal point for transmission and an ideal focal point for reception are both located within a common focal point zone.

26. The terminal of claim 16 wherein the receive and transmit feedhorns respectively receive and transmit linearly polarized signals and wherein the receive and transmit feedhorns are separately, pivotably mounted in relation to said antenna dish to allow linear polarization alignment with a predetermined target location.

27. The terminal of claim 26 wherein the predetermined target location is the location of a preselected geosynchronous satellite.

28. The terminal of claim 16 wherein the dish antenna and the receive and transmit feedhorns provide substantially equal illumination of the antenna dish and only the antenna dish.

29. The terminal of claim 16 wherein the transmit feedhorn provides a transmission radiation pattern having a magnitude, as a function of azimuthal angle, that is less than a predetermined maximum acceptable radiation pattern magnitude for a predetermined selected range of azimuthal angles.

30. The terminal of claim 16 wherein the antenna dish is 4 meters or less in diameter.

31. In a satellite communications terminal having an antenna dish and at least one full-duplex transmitter/receiver device having a means for receiving signals and a separate means for transmitting signals, with said means for receiving signals including a receive feedhorn for receiving signals only and with said means for transmitting signals including a transmit feedhorn for transmitting signals only, with the receive and transmit feedhorns mounted in relation to the antenna dish with the receive and transmit feedhorns being spatially offset from one another, a method of transmitting and receiving signals comprising the steps of:
   transmitting signals only through the transmit feedhorn located at a first position relative to the antenna dish, said first position being within a focal point zone of the antenna dish; and
   substantially simultaneously receiving signals, reflected from the antenna dish, only through the receive feedhorn located second position relative to the antenna dish, said second position also being within the focal point zone but being offset from the first position.

32. The method of claim 31 wherein the first transmit position is located at or near a pre-determined ideal focal point position for transmission based upon a pre-selected frequency of transmission.

33. The method of claim 31 wherein the second, receive position is located at a predetermined ideal focal point position for reception based upon a preselected frequency of reception.

34. The method of claim 31 wherein signals are transmitted at a frequency of about 14 gigahertz and wherein signals are received at a frequency of about 12 gigahertz.

35. The method of claim 31 wherein the step of transmitting signals is performed by routing linearly polarized signals through said transmit feedhorn and the step of receiving signals is performed by routing linearly polarized signals through said receive feedhorn.

36. The method of claim 31 wherein signals are transmitted with a transmission power selected to provide a transmission radiation pattern having a magnitude, as a function of azimuthal angle, that is less than a predetermined maximum acceptable radiation pattern magnitude for a predetermined selected range of azimuthal angles.

37. In a satellite communications terminal having an antenna dish and a full-duplex transmitter/receiver device, an improvement comprising:
   providing separate receive and transmit feedhorns to the full-duplex transmitter/receiver device, with the receive and transmit feedhorns mounted in relation to the antenna dish and with the receive feedhorn spatially offset from the transmit feedhorn with the receive feedhorn only receiving signals and the transmit feedhorn only transmitting signals.

38. The improvement of claim 37 wherein the receive and transmit feedhorns include, respectively, means for receiving linearly polarized signals and means for transmitting linearly polarized signals.

39. A satellite communications terminal comprising:
   an antenna dish; and
   a full-duplex transmitter/receiver device having separate receive and transmit feedhorns, with the receive and transmit feedhorns of the full-duplex transmitter/receiver device mounted in relation to the antenna dish and with the receive feedhorn spatially offset from the transmit feedhorn with the receive feedhorn only receiving signals and the transmit feedhorn only transmitting signals.

40. The terminal of claim 39 wherein the receive and transmit feedhorns include, respectively, means for receiving linearly polarized signals and means for transmitting linearly polarized signals.

* * * * *